Jan. 4, 1966  V. C. REES  3,227,797
ELECTRICAL CONTROL SYSTEM
Filed July 10, 1963  2 Sheets-Sheet 1

INVENTOR.
VERNON C. REES
BY
ATTORNEYS

United States Patent Office 3,227,797
Patented Jan. 4, 1966

3,227,797
ELECTRICAL CONTROL SYSTEM
Vernon C. Rees, Newark, Ohio, assignor to Owens-Corning Fiberglas Corporation, a corporation of Delaware
Filed July 10, 1963, Ser. No. 293,995
16 Claims. (Cl. 13—6)

The present invention relates to a control system for an electrically heated device such as a material container to program the supply of heating current to the device after a shut-down period to automatically regulate heating the device up to operating condition with safety and in a minimum period of time.

The invention is more particularly directed to a bushing temperature control system in apparatus for the manufacture of glass fibers.

In the manufacture of silicon or siliceous fibers or filaments, such as glass fibers and the like, the glass to be formed is maintained in a molten state in electrically energized or heated containers referred to as bushings These bushings are typically energized to maintain the molten glass at a constant temperature in the order of approximately 2300° F. during the fiber forming operations. Usually, the manufacturing operation continues on a twenty-four hour a day basis. Oftentimes the electric power supply for energizing the bushing is cut off due to generating equipment failure or transmission line failure caused by accumulation of snow on the power lines, electrical storms, explosions, and other unforeseen circumstances. These power failures may last for periods of minutes to several hours, but generally the power is returned on an average within a period of an hour.

During the time that the power supply is cut off, the bushings gradually fall in temperature characteristically along an exponential decay curve from the operating temperature to ambient temperature.

In the manufacture of heat softenable materials such as glass fibers for textile strands and yarns there are inevitably times in which the electrical power supplied to the textile bushing fails, resulting in loss of temperature in the textile bushing, and there are other times when the textile bushing is purposely shut down for cleaning of associated auxiliary equipment such as cone shields or other maintenance. During these times the textile bushing temperature falls from the operating temeperature of the bushing. When power is again applied to the textile bushing, it is of paramount importance that the power be applied at such a rate as to avoid current surges damaging to the bushing and while raising the temperature to operating range with a minimum loss of time.

In order, therefore, to effectively establish efficient operating conditions in the textile bushing, it is an object of the invention to provide a programming system for bushing temperature buildup control upon startup of the apparatus.

A further object of the invention is to provide temperature buildup control means for automatically programming the temperature of electrically heated apparatus, such as a textile bushing for the manufacture of glass fibers, so that the desired operating temperature may be achieved within a specified time related to the temperature to which it has cooled, or in another sense, to the period of time the textile bushing has been shut off from its source of power.

Generally, the control system of the invention comprises a temperature sensitive element such as a thermocouple which senses the temperature of the bushing, a heat accumulator device including in assembly a heat generating element such as an electrical resistance having associated therewith a heat storage device made up of surrounding heat absorbing material and heat insulation material plus a second temperature sensitive element which senses the temperature of a predetermined region of the accumulator, and current control means in the bushing current supply circuit arranged to be responsive to the signals generated by both the bushing and accumulator.

A present preferred embodiment of the heat accumulator device including a resistor, a heat storage element or in other words, a heat sink and associated heat insulation so selected that upon deenergization its temperature diminishes exponentially and gradually over a period corresponding substantially to the period required for efficient and safe buildup in temperature of the bushing to its normal operating temperature. A thermocouple is associated with the resistor and heat sink assembly portion of the accumulator to sense its temperature and provide a signal in response thereto that when added to the bushing thermocouple signal, the temperature controller for the bushing will receive a substantially constant signal during startup of the bushing and, accordingly, the current flow through the bushing will be restrained during startup generally to a magnitude flowing at normal operating temperatures, thereby eliminating the need for manual or semiautomatic regulation during the startup period. Instead of allowing a surge of current to flow through the bushing with attendant tendency toward damage at start-up which would otherwise occur since the bushing thermocouple would indicate to the controller that the bushing to be cold, the resistor thermocouple provides a signal to the controller corresponding to a bushing temperature higher than the actual bushing temperature. Accordingly, the controller will restrain the current flow as the bushing temperature is built up, whereupon the bushing thermocouple gradually builds up its signal to become the controlling signal as the influence of the resisitor thermocouple diminishes in magnitude.

In case of power failure or when it is desired to shut down electrical equipment for short time repairs and maintenance, the programming resistor is automatically energized by a battery circuit to heat the resistor at a rate to build up the accumulator temperature in inverse relation to the reduction in bushing temperature. When the power is available to reapply it to the bushing, which may be at any point in the accumulator temperature buildup cycle, the battery power to the program resistor is automatically cut off by the programmer system and the additive signal of the resistance and heat accumulator thermocouples is employed to control the amount of current the bushing should receive at each point in time to return the bushing to full operating temperature. More generally stated, the return of power at any degree of cooloff of the bushing would be exactly compensated by the cooling of the resistor from a value below its top temperature. In other words, after a power failure the decrease in signal from the bushing thermocouple caused by the cooling of the bushing is compensated at all times by the increase in signal from the heat accumulator thermocouple caused by the heating of the heat accumulator.

It is thus an object of the invention to provide programming means for broadly storing information concerning the magnitude of electrical operating loads on the bushing at the instant of shut down throughout the down times caused by power failures or effected for maintenance such as fin cleaning and the like, as well as to use the stored information to effect efficient reenergizing of the load operation.

In its preferred embodiment, the invention consists of two heat sensors such as thermocouples connected in additive relationship, one placed in contact with the heat generator or bushing, while the other is in contact with a heat accumulating resistance. The second thermocouple would then establish a signal in the thermocouple circuit as the temperature of the resistor and heat sink is raised by the supply of power to the resistor from a separate heat source. The time characteristic of the accumulator is dependent upon the physical design of the resistance, its mass, and its wattage per square inch of heat dissipation. The total time characteristic of the accumulator is also dependent upon the type, amount, and placement of associated insulating material and heat sink structures.

The temperature characteristic of the accumulator, however, need not be the exact inverse characteristic of the bushing temperature cooling characteristic, but may be given a different characteristic designed to provide a desired rate of current buildup from any temperature level.

It is within the scope of the invention to provide a resistor thermocouple and a resistor in a single programming unit which can be replaced by another programming unit having a different exponential decay characteristic and thereby provide any of a number of current buildup rates for startup of the bushing from any temperature level to which it has cooled.

By incorporation of the temperature programming units in a control system for electrical apparatus, according to the concepts of the present invention, entire banks of bushings can be restarted automatically without fear of overloading power supply resulting in consequent possibility of circuit breaker tripout. Accordingly, the manual labor and time required for startup upon power failure with consequent loss of production is greatly reduced.

The above and other objects and advantages of the invention will be more fully apparent from the following detailed description and the accompanying drawings wherein.

Figure 1:
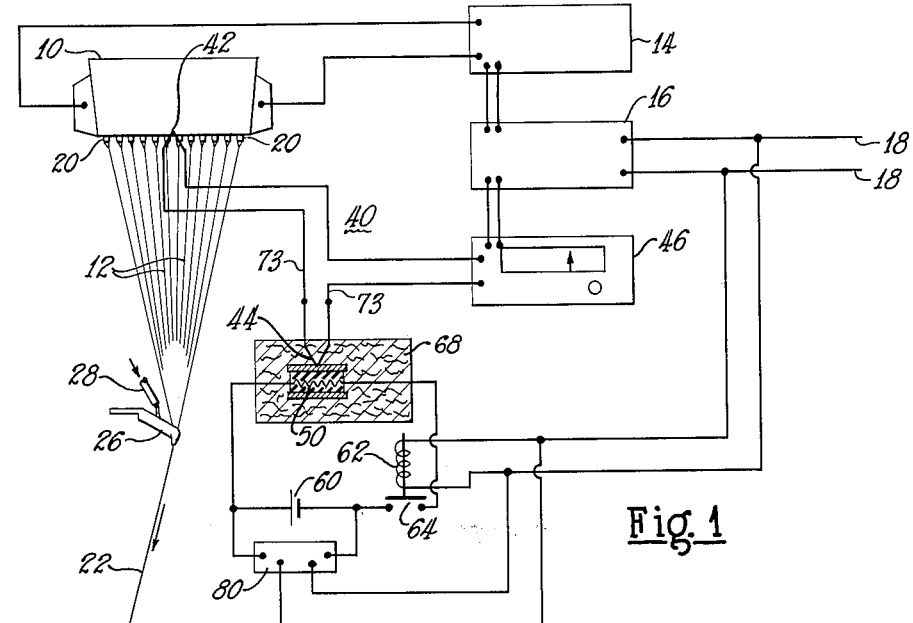
FIG. 1 is a schematic circuit diagram of the programming system for electrical apparatus according to a preferred embodiment of the invention.

Referring now to FIG. 1, there is shown a molten glass container or textile bushing 10 for forming textile fibers 12 from molten glass. The molten glass is maintained at a normal operating temperature of about 2300° F. The operating temperature is maintained within the desired range by direct passage through the bushing 10 of electrical current supplied from a transformer 14 which is energized in response to control of a saturable core reactor 16 connected to power supply conductors 18. Satisfactory results may be obtained by replacing the reactor 16 with a silicon controlled rectifier, or any other suitable power control device.

The textile fibers 12 are formed of the molten glass fed through orifices 20 in the bottom of the bushing 10. The fibers 12 are gathered together into a strand 22 by passage of the fibers over a gathering member 26 in a manner well known in the art. The fibers are supplied with sizing fluid at the gathering member 26 from a supply tube 28 communicating with a source of sizing fluid in a known manner, but not shown here. The successively formed portions of the strand 22 are wound upon a package 30 by a winder unit 32 as the strand 22 is caused to traverse the package 30 by a spiral wire-type traverse mechanism 36.

The bushing 10 receives glass marbles which are heated into molten form by the secondary winding of the transformer 14. The heating current for the bushing 10 is derived from alternatiing current supplied through the conductors 18, for example, for a 440 volt, 60 cycle source, not shown.

A programming system 40 includes an electrical circuit with at least two thermocouples 42, 44 in series with a temperature control instrument 46 for maintaining the temperature of the bushing 10. The thermocouple 42 senses the temperature of the feeder while the thermocouple 44 senses the temperature at the heat sink 87 of a heat accumulator which includes a storage or programming resistor 50.

Figure 2:
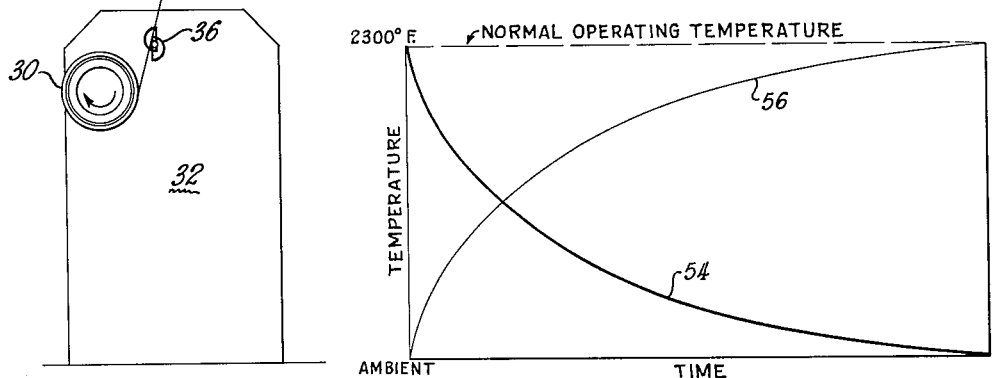
FIG. 2 is a temperature-time chart showing the characteristic curves of the heat accumulator and the electrically heated load.

Referring to FIG. 2, the temperature-time cooling characteristic curve 54 of the bushing 10 as the temperature of the bushing decreases due to power failure or temporary shut-down of the bushing for fin cleaning or the like is sensed by the thermocouple 42. The temperature-time characteristic curve 56 of the accumulator heat sink 71 heated by the programming resistor 50 is complementary or inverse to the curve 54 as the temperature of the resistor increases due to current supplied thereto from a battery 60, such as a Burgess 1.25 v. battery.

As is apparent from the circuit arrangement of the programming system 40, the resistor 50 is energized when the power supplied through the conductors 18 fails or is shut down, since deenergization of relay 62 allows contacts 64 to close to complete circuits 50, 60, 64.

The programming resistor 50 is embedded in an insulating material 68, such as glass fiber, and the mass of insulation with the imbedded resistor 50 is surrounded by a heat sink 71 and is encased in a housing 70. The temperature-time characteristics of the assembly are such that upon deenergization of the resistor 50, which occurs when power is again applied to the conductors 18 resulting in energization of the relay 62 to open the contacts 64, the heat of the resistor 50 as sensed by thermocouple 44 at the heat sink 71 diminishes exponentially over a period of time logarithmically proportional to the period of time that the resistor 50 was energized. Thermocouple 44 therefore provides a signal additively combined with the signal derived in the bushing thermocouple 42 whereby a combined or control temperature signal is provided in controller 46 for regulating the magnitude of power that the saturable core reactor 16 will allow the transformer 14 to supply to the bushing 10 and the rate at which the temperature of the bushing may be raised during the reenergization of the bushing while the programming resistor is decreasing in temperature.

When generally complementary curves 54, 56 are provided, the series arrangement of thermocouples 42, 44 causes the bushing controller 46 to receive a substantially constant signal with a consequent supply of constant power to the terminals 18 during the startup period of the bushing. Accordingly, the current flow through the bushing which would otherwise be a surge, will be restrained to a substantially constant value during startup thereby eliminating the need for tedious and randomly inaccurate manual regulation of the bushing.

Instead of a surge of current being directed through the bushing 10 as called for by thermocouple 42 sensing a cold bushing, the resistor 50 produces a complementary control signal in thermocouple 44 so that the bushing temperature appears apparently higher than it actually is in regulating the saturable core reactor 16. Accordingly, the controller 46 restrains the current flow in the saturable core reactor from the conductors 18 to the bushing 10, while the temperature of the bushing is being continually built up. Correspondingly, the bushing thermocuple 42 gradually develops an increased controlling signal as the influence of the heat accumulator thermocouple 44 diminishes. In other words, the accumulator provides an auxiliary signal subject to deenergization of the power source which establishes with the signal supplied by the thermocouple 42 a false indication to the controller of a temperature at the bushing corresponding to a full operating condition.

This auxiliary signal increases in magnitude at a rate matched to the rate of cooling of the bushing, and when added to the signal supplied by the thermocouple 42 substantially equals the temperature signal supplied by the thermocouple 42 at full operating level of the bushing. In this sense then, the combination of the accumulator in the system causes the control system to remember the operating temperature of the bushing at the time of de-energization no matter for how long the power outage may occur. Upon return of power, the system limits the amount of power supplied to the bushing to a non-damaging value as its temperature returns to the original operating level.

The housing 70 may be generally configured to resemble what is known as a pill box having a closure 72 that completes the enclosure of the imbedded resistor 50, the heat sink 71, and the thermocouple 44. The copper tube forming the heat sink 71 is provided to store the heat (or energy) dissipated by the resistor 50 and is a most important factor in determining the time-temperature curve of the accumulator.

Figure 3:
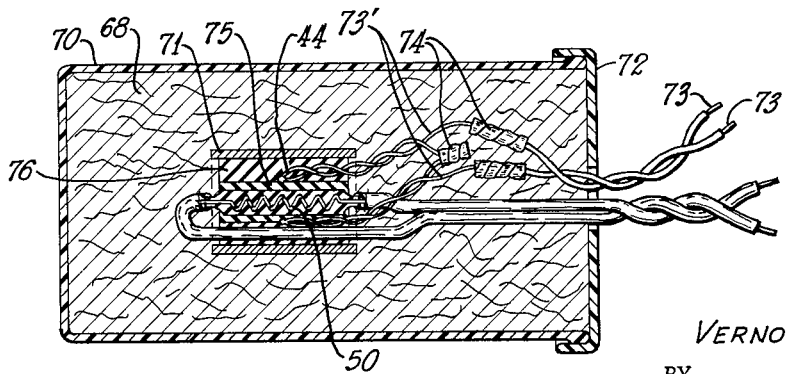
FIG. 3 shows an illustrative arrangement of a heat accumulator.

All the connections for the thermocouple to lead wires 73 may be soldered connections wrapped with strips of tape 74. The thermocouple wires are designated by reference numeral 73'. A heat resistant tape 75 may be interposed between the resistor 50 and the thermocouple 44, and additional wrapping of heat resistant tape 76 may be applied to cover the thermocouple and fill the tube 71 as shown in FIG. 3.

Figure 4:
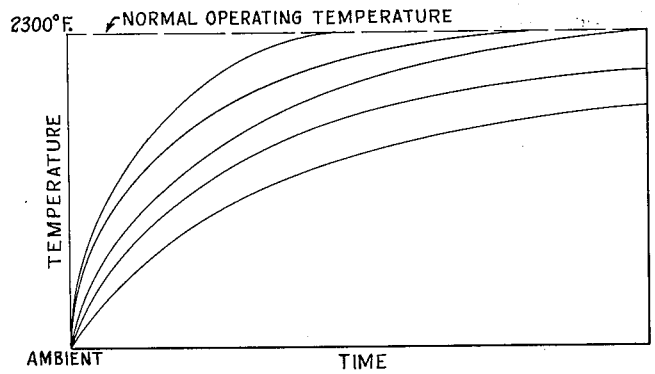
FIGS. 4 and 5 show other characteristic curves for heat accumulator systems in accordance with further embodiments of the invention.
Figure 5:
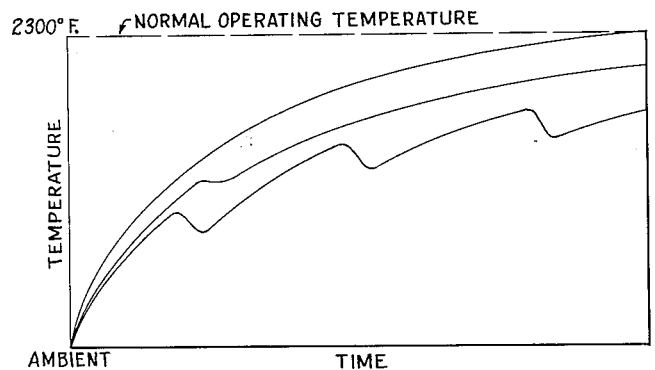

It is possible within the scope of the invention to provide an additional thermocouple or an assembly of thermocouples which may be connected in parallel or series, as desired, to provide other time-temperature characteristics shown in the curves of FIGS. 4 and 5.

A charger 80 is provided to recharge the battery 60 when power has been reapplied to the conductors 18.

The programmer resistor may be replaced by other analogous programming devices to provide additive and compensating signals to control the power applied to the primary of the transformer 14. It is within the scope of the invention to provide other control devices, such as a silicon controlled rectifier, in place of the reactor 16.

Although throughout the description of the preferred embodiment of the invention mention has been made that the thermocouple device within the accumulator senses the temperature of the resistor 50, it must be understood that the thermocouple device may be situated to sense the temperature of the accumulator at verious points thereof, if desired.

It has been found that among the advantages of the invention, the power supplied to the bushing 10 does not have to be turned off to lower the temperature thereof, for example, for fin cleaning. During normal operating conditions, if the accumulator resistor 50 were heated, as for example by closing the contacts 64, the controller then "sees" a false temperature increase and curtails the power supplied to the bushing allowing it to cool to a temperature suitable for fin cleaning. The contacts 64 are then opened, the accumulator cools, and the adequate power is resupplied to the bushing to return it to operating temperature.

Preferred embodiments of the invention have been described. Various changes and modifications, however, may be made within the scope of the invention as set forth in the appended claims.

I claim:

1. A control system for an electrically heated device comprising a first temperature sensitive element in temperature sensing relation to said device for producing a signal proportional to the temperature of said device, a heat accumulator exhibiting temperature-time characteristics substantially inverse to the temperature-time characteristics of said device, a second temperature sensitive element in temperature sensing relation to said heat accumulator for producing a signal proportional to the temperature of said heat accumulator, and a heating current supply circuit connected to said device including current control means responsive to the sum of the signals generated by said first and second temperature sensitive elements.

2. A control system for an electrically heated device comprising a first temperature sensitive element in temperature sensing relation to said device for producing a signal proportional to the temperature of said device, a heat accumulator exhibiting temperature-time characteristics substantially inverse to the temperature-time characteristics of said device; a second temperature sensitive element in temperature sensing relation to said heat accumulator for producing a signal proportional to the temperature of said heat accumulator, a heating current supply circuit connected to said device including current control means responsive to the sum of the signals generated by said first and second temperature sensitive elements, and means independent of said heating current supply for supplying heat energy to said heat accumulator.

3. A control system for an electrically heated fiber-forming bushing comprising a first thermocouple in temperature sensing relation to said bushing for producing a signal proportional to the temperature of said device, an electrically energized heat accumulator exhibiting temperature-time characteristics substanitally inverse to the temperature-time characteristics of said device, a second thermocouple in temperature sensing relation to the heat accumulator, a heating current supply circuit connected to said bushing including current control means responsive to the sum of the signals generated by said first and second thermocouples, and a second heating current supply circuit independent of the bushing heating current supply connected to said heat accumulator.

4. A control system as defined in claim 3 wherein the heat accumulator includes an electrical resistor.

5. A control system as defined in claim 3 wherein the heat accumulator includes an electrical resistor and heat insulation associated therewith to provide a temperature-time characteristic substantially inverse to the temperature-time characteristic of the bushing.

6. A control system as defined in claim 3 wherein the heat accumulator includes an electrical resistor, a heat sink element, and heat insulation associated therewith to provide a temperature-time characteristic substantially inverse to the temperature-time characteristic of the bushing.

7. A control system as defined in claim 3 wherein the heat accumulator energizing circuit is energized in response to failure of the heating current supply to the bushing.

8. A control system as defined in claim 3 wherein the heat accumulator is energized by a battery circuit.

9. A control circuit as defined in claim 8 wherein the battery circuit is connected to the heat accumulator in response to failure of the heating current supply to the bushing.

10. A control circuit as defined in claim 9 wherein the battery is recharged by the bushing heating current supply source on restoration thereof.

11. A programming control system comprising a heated load, an electrical source for applying current to said load, control means interposed between said source and said load including a time responsive heating element energized from said source and having temperature-time characteristics substantially inverse to the temperature-time characteristics of said load, a switch circuit to apply current to said time responsive heating element while said load is de-energize, coupling means from said load to said time responsive heating element to control the heat of said time responsive heating element while heat is being dissipated from said load.

12. Method of bringing an electrically heated fiber-forming bushing to a preselected operating temperature after de-energization comprising providing a programmed signal matched with and inversely proportional to the temperature-time cooling characteristics of said bushing, sensing said programmed signal for temperature at the time of re-energization, and bringing said bushing temperature up to said operating temperature at a rate substantially matched to the inverse of said temperature-time cooling characteristics.

13. A control system for an electrically heated unit comprising a source of electrical energy for said unit, temperature sensing means associated with said unit adapted to supply a signal corresponding to the temperature of said unit, control means for varying the energy supplied from said source to said unit responsive to variations in temperature signal supplied by said temperature sensing means, said control means adapted to maintain the temperature of said unit substantially fixed at a predetermined desired operating level, and auxiliary signal means operable subject to de-energization of said energy source providing to said control means an apparent temperature signal falsely indicating operation of said unit at said desired operating temperature level, whereby upon de-energization of said heating unit the energy supplied to said unit upon re-energization is limited to a magnitude corresponding substantially to that supplied at said desired operating level.

14. The control system of claim 13 wherein the auxiliary signal means is adapted to provide a varying signal substantially matched in rate of increase to the rate of cooling of said unit upon de-energization of said source.

15. A control system for an electrically heated unit comprising a source of electrical energy for said unit, temperature sensing means associated with said unit adapted to supply a signal corresponding to the temperature of said unit, control means for modulating the supply of energy from said source to said unit responsive to deviations in said temperature signal from a predetermined value corresponding to a desired operating temperature level, and auxiliary signal means operable subject to de-energization of said energy source providing to said control means an apparent temperature signal falsely indicating operating of said unit at said desired operating temperature level, whereby upon de-energization of said heating unit the energy supplied to said unit upon re-energization is limited to a magnitude corresponding substantially to that supplied at said desired operating level.

16. An electrical control system for a heating unit comprising a source of heat energy for said unit, temperature sensing means associated with said unit adapted to supply an electrical signal corresponding to the temperature of said unit, control means for varying the heat energy supplied from said source to said unit responsive to a signal supplied by said temperature sensing means, said control means adapted to vary the heat energy supplied to said unit to maintain the temperature of said unit substantially fixed at a predetermined desired operating level, and auxiliary signal means operable in response to a predetermined sudden reduction of the heat energy supplied to said unit providing to said control means an apparent control signal falsely indicating operation of said unit at a predetermined temperature level different from that corresponding to the reduced energy supply level, whereby upon occurrence of a sudden reduction in the supply of heat energy to said unit reestablishment of the supply of energy corresponding to the desired operating level of the unit is at a predetermined desired rate dependent upon the signal provided by said auxiliary signal means.

References Cited by the Examiner
UNITED STATES PATENTS

| | | | |
|---|---|---|---|
| 2,148,491 | 2/1939 | Moore | 236—68 |
| 2,339,635 | 1/1944 | Hall | 219—494 |
| 2,496,860 | 2/1950 | Davis | 236—68 |

RICHARD M. WOOD, *Primary Examiner.*

JOSEPH V. TRUHE, *Examiner.*